(12) United States Patent
Browning

(10) Patent No.: US 9,149,077 B1
(45) Date of Patent: Oct. 6, 2015

(54) CELL PHONE GLOVE

(71) Applicant: Susan L. Browning, Jonesboro, LA (US)

(72) Inventor: Susan L. Browning, Jonesboro, LA (US)

( * ) Notice: Subject to any disclaimer, the term of this patent is extended or adjusted under 35 U.S.C. 154(b) by 112 days.

(21) Appl. No.: 14/044,275

(22) Filed: Oct. 2, 2013

(51) Int. Cl.
*A41D 19/00* (2006.01)
*A45C 11/00* (2006.01)

(52) U.S. Cl.
CPC ......... *A41D 19/002* (2013.01); *A45C 2011/002* (2013.01)

(58) Field of Classification Search
CPC ............ A41D 19/0013; A41D 19/002; A41D 19/0044; A41D 27/205; A45F 2005/008; A44C 5/003; A45C 2001/002
USPC .................. 2/162, 163, 170, 159, 160, 161.1, 2/161.6; 224/217, 218, 219
See application file for complete search history.

(56) References Cited

U.S. PATENT DOCUMENTS

| | | | |
|---|---|---|---|
| 114,404 A * | 5/1871 | Brown, Jr. ...................... 224/217 |
| 214,823 A * | 4/1879 | Hopkins ........................ 224/218 |
| 471,000 A * | 3/1892 | Green ............................ 224/217 |
| 1,719,641 A * | 7/1929 | Abrahamson ................. 224/217 |
| 1,966,822 A * | 7/1934 | Lieb ............................... 359/517 |
| 2,555,203 A * | 5/1951 | Ramsey ......................... 219/211 |
| 3,037,209 A * | 6/1962 | Applegate, Jr. et al. ............. 2/20 |
| 3,770,270 A * | 11/1973 | Ingold ............................. 473/61 |
| 4,850,341 A * | 7/1989 | Fabry et al. ..................... 601/40 |
| 4,864,658 A | 9/1989 | Russell et al. |
| 5,079,776 A * | 1/1992 | Crawford ........................... 2/20 |
| 5,239,521 A | 8/1993 | Blonder |
| 5,468,200 A * | 11/1995 | Hoffman ......................... 482/55 |
| 5,607,090 A * | 3/1997 | Brown .......................... 224/217 |
| D380,874 S * | 7/1997 | Caswell ....................... D29/113 |
| 5,924,136 A * | 7/1999 | Ogean ............................. 2/159 |
| 6,029,277 A * | 2/2000 | Picchione, II .................... 2/162 |
| 6,044,153 A | 3/2000 | Kaschke |
| 6,182,293 B1 * | 2/2001 | Mustin ........................... 2/161.1 |
| 6,208,876 B1 | 3/2001 | Raussi et al. |
| D447,623 S * | 9/2001 | Troska ........................... D3/215 |
| 7,254,376 B2 | 8/2007 | Park et al. |
| 7,334,711 B1 * | 2/2008 | Winters ........................ 224/217 |
| 7,996,922 B2 | 8/2011 | Ross et al. |
| 8,356,362 B1 * | 1/2013 | Robertson et al. .................. 2/16 |
| 2003/0057240 A1 * | 3/2003 | Johnson ....................... 224/219 |
| 2003/0164389 A1 | 9/2003 | Byers |
| 2005/0205622 A1 * | 9/2005 | Liu ............................... 224/217 |
| 2006/0124675 A1 | 6/2006 | Calicott |
| 2007/0083979 A1 | 4/2007 | Daniels |
| 2007/0101479 A1 | 5/2007 | Turner |
| 2007/0170216 A1 | 7/2007 | Davis |
| 2008/0017678 A1 * | 1/2008 | Anderson et al. ............. 224/221 |
| 2008/0084390 A1 | 4/2008 | Jones |
| 2010/0139048 A1 * | 6/2010 | Pesic ............................... 24/3.2 |
| 2010/0175161 A1 | 7/2010 | Jarboe |
| 2012/0217275 A1 * | 8/2012 | Yu ................................ 224/267 |
| 2013/0240579 A1 * | 9/2013 | Yu ................................ 224/217 |
| 2013/0240580 A1 * | 9/2013 | Yu ................................ 224/217 |

FOREIGN PATENT DOCUMENTS

GB          2407023 A  *  4/2005

* cited by examiner

*Primary Examiner* — Amy Vanatta
(74) *Attorney, Agent, or Firm* — R. Keith Harrison

(57) ABSTRACT

A cell phone glove includes a wrist portion, a wrist space in the wrist portion, a cell phone pocket in the wrist portion adjacent to the wrist space, a finger portion disposed in spaced-apart relationship to the wrist portion, a plurality of connecting straps connecting the finger portion to the wrist portion and a hand space between the wrist portion and the finger portion.

16 Claims, 6 Drawing Sheets

CELL PHONE GLOVE

FIELD

Illustrative embodiments of the disclosure generally relate to cell phones. More particularly, illustrative embodiments of the disclosure relate to a cell phone glove which securely holds a cell phone in such a manner that a wearer can easily access and view the cell phone when walking or jogging.

BACKGROUND

Cellular telephones, particularly "smart phones", are commonly used to connect users with other in personal and business relationships. Due to the widespread use of phone calls, texting and emailing, many cell phone users consider it necessary to carry their cell phones with them wherever they go. This may present a challenge, however, when the user is engaged in walking, jogging or some other form of exercise.

Accordingly, a cell phone glove which securely holds a cell phone in such a manner that a wearer can easily access and view the cell phone when walking or jogging may be desirable.

SUMMARY

Illustrative embodiments of the disclosure are generally directed to a cell phone glove which securely holds a cell phone in such a manner that a wearer can easily access and view the cell phone when walking, jogging or engaging in other forms of exercise. An illustrative embodiment of the cell phone glove includes a wrist portion, a wrist space in the wrist portion, a cell phone pocket in the wrist portion adjacent to the wrist space, a finger portion disposed in spaced-apart relationship to the wrist portion, a plurality of connecting straps connecting the finger portion to the wrist portion and a hand space between the wrist portion and the finger portion.

BRIEF DESCRIPTION OF THE DRAWINGS

Illustrative embodiments of the disclosure will now be described, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable users skilled in the art to practice the disclosure and are not intended to limit the scope of the claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description.

Figure 7:
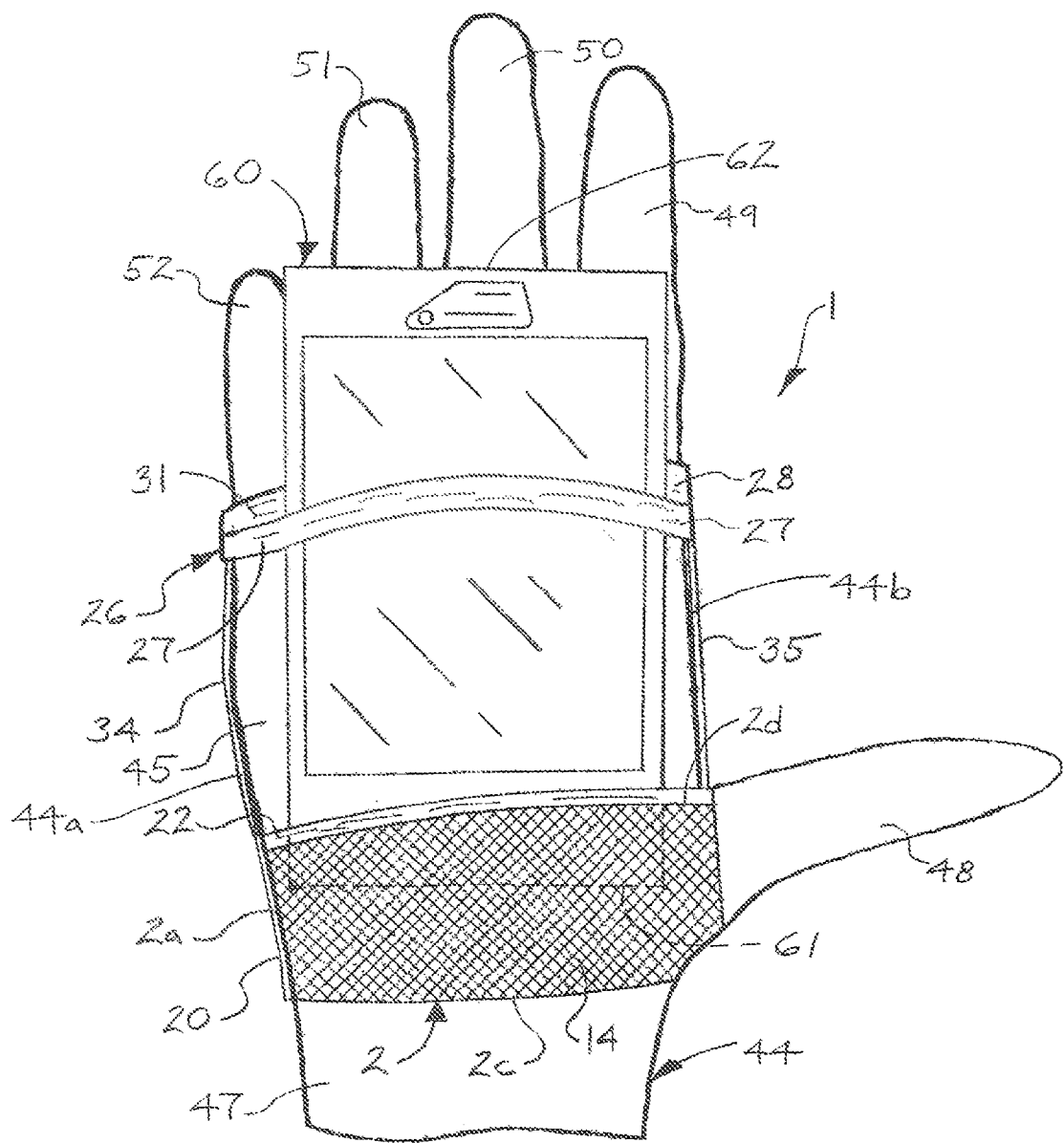
FIG. 7 is a palm side view of an illustrative cell phone glove, worn on the hand of a wearer with a cell phone secured in place on the glove and the wearer's hand in exemplary application of the cell phone glove.
Figure 8:
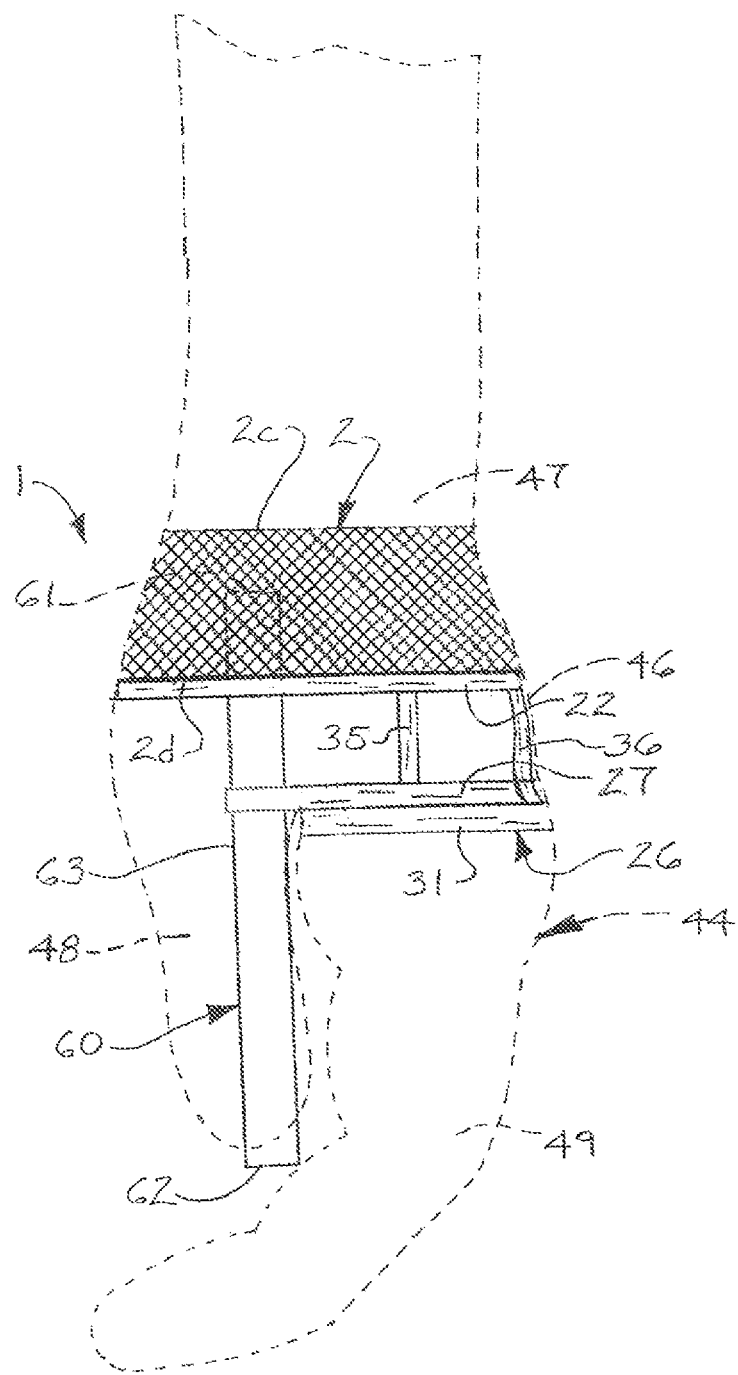
FIG. 8 is a side view of an illustrative cell phone glove, worn on the hand of a wearer and the cell phone secured in place on the glove and the wearer's hand, with the cell phone retained in place as the hand of the user is in a lowered position in exemplary application of the cell phone glove.

Referring initially to FIGS. 7 and 8 of the drawings, an illustrative embodiment of the cell phone glove is generally indicated by reference numeral 1. The cell phone glove 1 includes as wrist portion 2. A finger portion 26 is disposed in spaced-apart relationship to the wrist portion 2. At least one connecting strap 34, 35, 36 connects the finger portion 26 to the wrist portion 2. In exemplary application of the cell phone glove 1, which will be hereinafter described, the wrist portion 2 accommodates the wrist 47 on the hand 44 of a user. The finger portion 26 accommodates the index finger 49, the middle finger 50, the ring finger 51 and the little finger 52 of the user's hand 44. The cell phone glove 1 securely supports and retains a cell phone 60 in such a manner that the cell phone 60 can be easily accessed and viewed by the user as the user engages in walking, jogging or other exercise.

Referring next to FIGS. 1-6 of the drawings, the wrist portion 2 of the cell phone glove 1 may have an inner wrist portion edge 2a, an outer wrist portion edge 2b and a hand insertion edge 2c and a hand protrusion edge 2d extending between the inner wrist portion edge 2a and the outer wrist portion edge 2b. As the cell phone glove 1 is donned on the hand 44 of the user, the hand 44 is inserted through the wrist portion 2 at the hand insertion edge 2c and protrudes from the hand protrusion edge 2d. The inner wrist portion edge 2a and the outer wrist portion edge 2b extend along the medial edge 44a and the lateral edge 44b, respectively, of the hand 44 as the hand 44 is oriented in the lowered, palm-forward position. A thumb opening 13 (FIGS. 2 and 4) is provided in the outer wrist portion edge 2b of the wrist portion 2 to accommodate the user's thumb 48.

Figure 1:
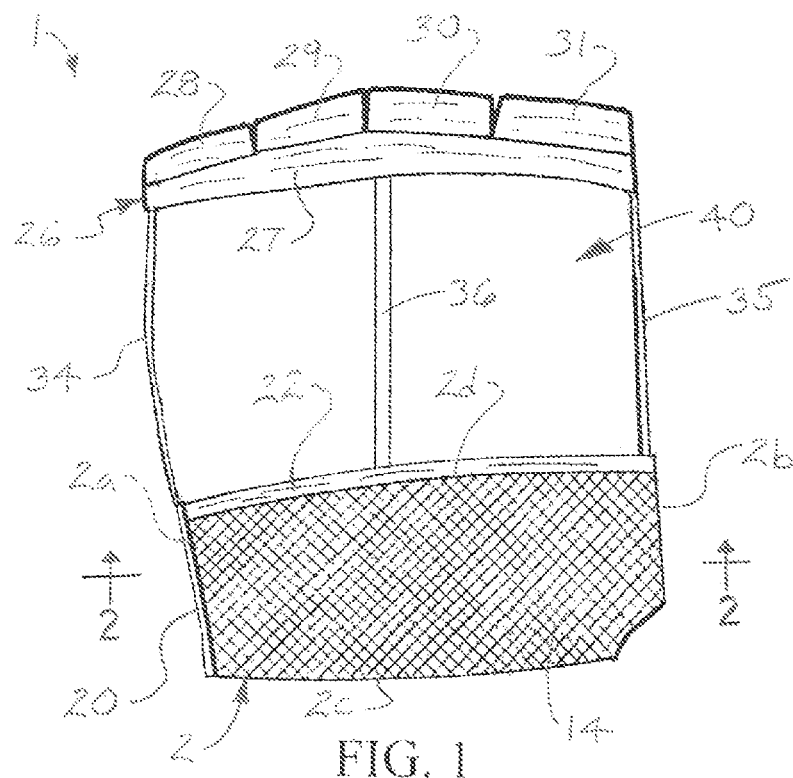
FIG. 1 is a palm side view of an illustrative embodiment of the cell phone glove.
Figure 2:
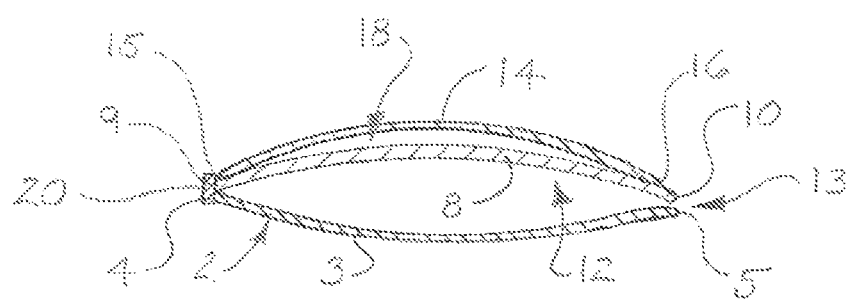
FIG. 2 is a cross-sectional view, taken along section lines 2-2 in FIG. 1.
Figure 3:
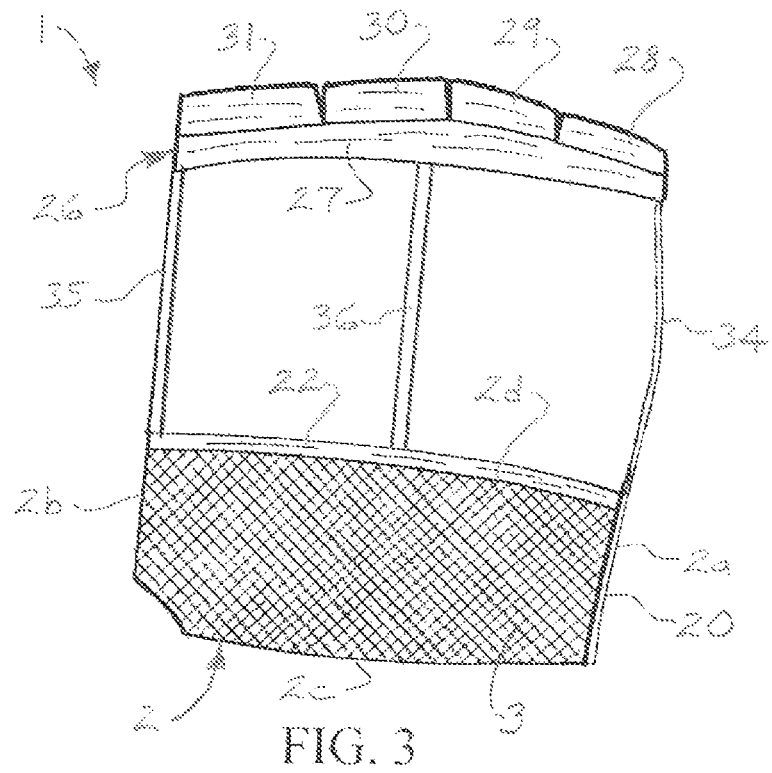
FIG. 3 is a backhand side view of an illustrative cell phone glove.
Figure 4:
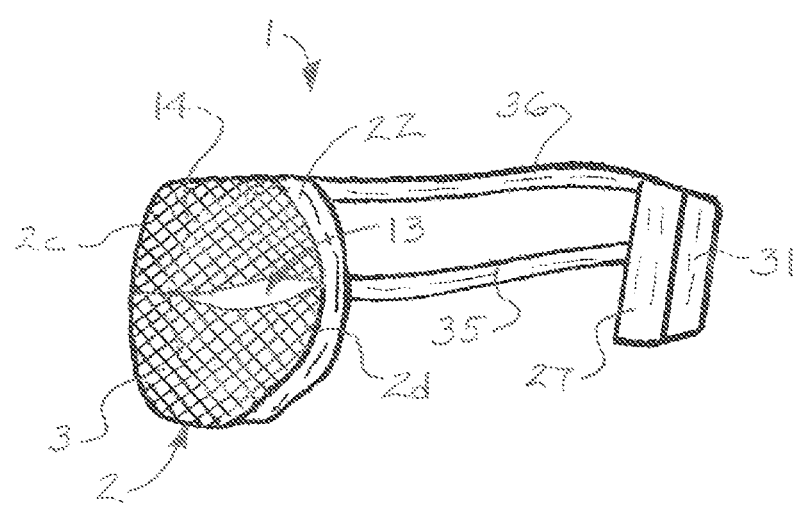
FIG. 4 is a side view of an illustrative cell phone glove.

As illustrated in FIG. 2, the wrist portion 2 may include a backhand panel 3 which faces the backhand side 46 (FIG. 5) of the lower portion of the user's hand 44 when the cell phone glove 1 is donned on the hand 44. The backhand panel 3 may have an inner backhand panel edge 4 which corresponds in position to the inner wrist portion edge 2a and an outer backhand panel edge 5 which corresponds in position to the outer wrist portion edge 2b. A palm panel 8 which faces the palm side 45 (FIG. 6) of the hand 44 may be attached to the backhand panel 3. The palm panel 8 may have an inner palm panel edge 9 which corresponds in position to the inner wrist portion edge 2a and an outer palm panel edge 10 which corresponds in position to the outer wrist portion edge 2b. The inner palm panel edge 9 of the palm panel 8 may be attached to the inner backhand panel edge 4 of the backhand panel 3 via sewing and/or other suitable attachment technique. In some embodiments, the inner backhand panel edge 4 of the backhand panel 3 and the inner palm panel edge 9 of the palm panel 8 may be attached to an inner wrist portion strap 20 via sewing and/or other suitable attachment technique. A wrist space 12 is formed by and between the backhand panel 3 and the palm panel 8 to accommodate the wrist 47 on the hand 44 of the user. The outer palm panel edge 10 of the palm panel 8 may remain unattached to the outer backhand panel edge 5 of the backhand panel 3 along at least a portion of the outer wrist portion edge 2b to form the thumb opening 13, which communicates with the wrist space 12.

As further illustrated in FIG. 2, a pocket panel 14 may be attached to the palm panel 8. The pocket panel 14 may have an inner pocket panel edge 15 and an outer pocket panel edge 16 which may be attached to the palm panel 8 generally at the inner wrist portion edge 2a and the outer wrist portion edge 2b, respectively, via sewing and/or other suitable attachment technique. The pocket panel 14 may be additionally sewn and/or otherwise attached to the palm panel 8 generally along the hand insertion edge 2c of the wrist portion 2. A cell phone pocket 18 is formed by and between the palm panel 8 and the pocket panel 14. The cell phone pocket 18 is sized and configured to accommodate a lower portion of the cell phone 60 (FIG. 7) in exemplary application of the cell phone glove 1, which will be hereinafter described. Each of the backhand panel 3, the palm panel 8 and the pocket panel 14 of the wrist portion 2 may include cotton, nylon, polyester, vinyl, leather, rubber, metal, plastic or a blend of such materials, for example and without limitation, and may have a mesh, sheet, panel or other construction known by those skilled in the art.

Figure 5:
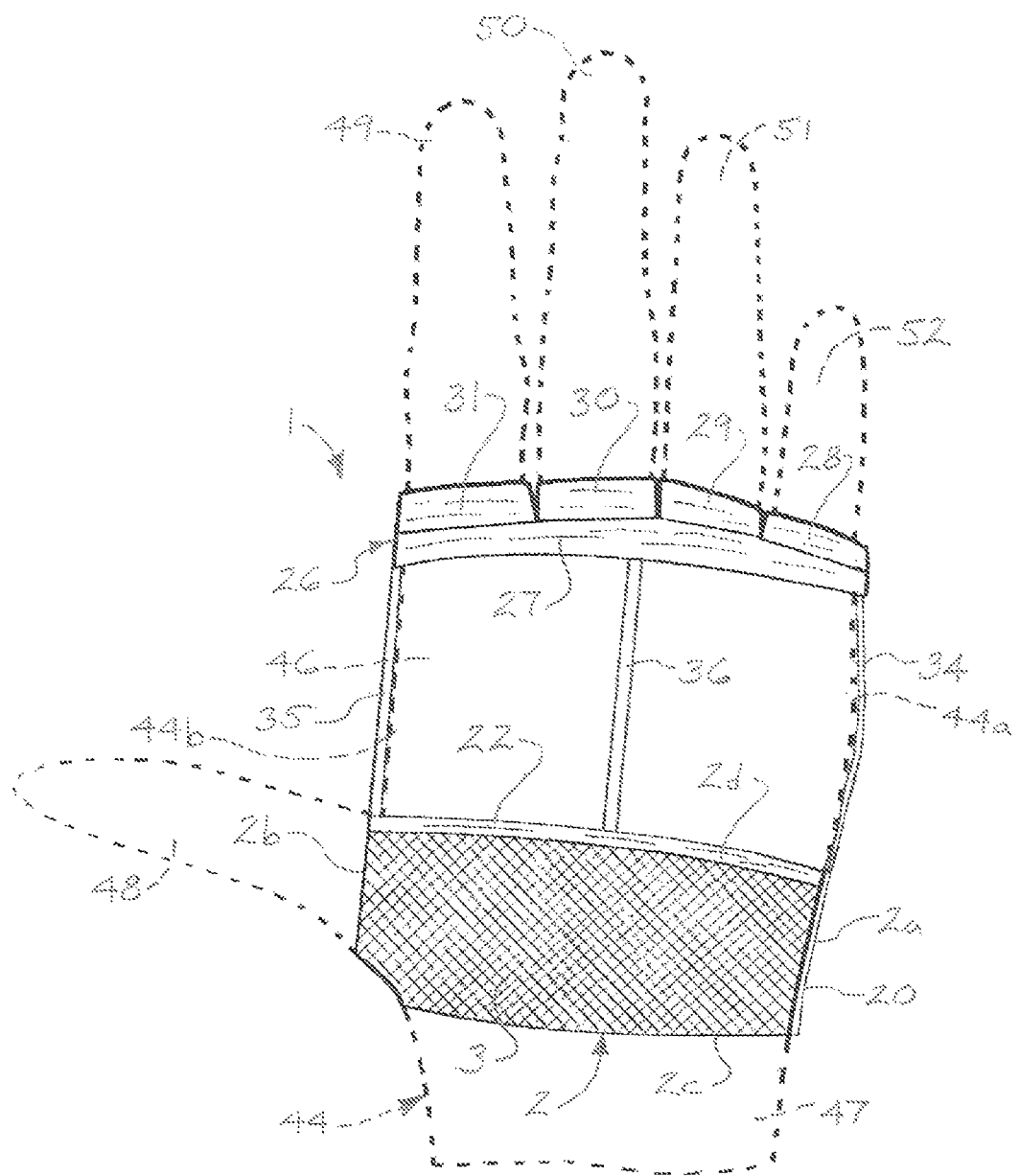
FIG. 5 is a backhand side view of an illustrative cell phone glove, worn on the hand (illustrated in phantom) of a wearer.
Figure 6:
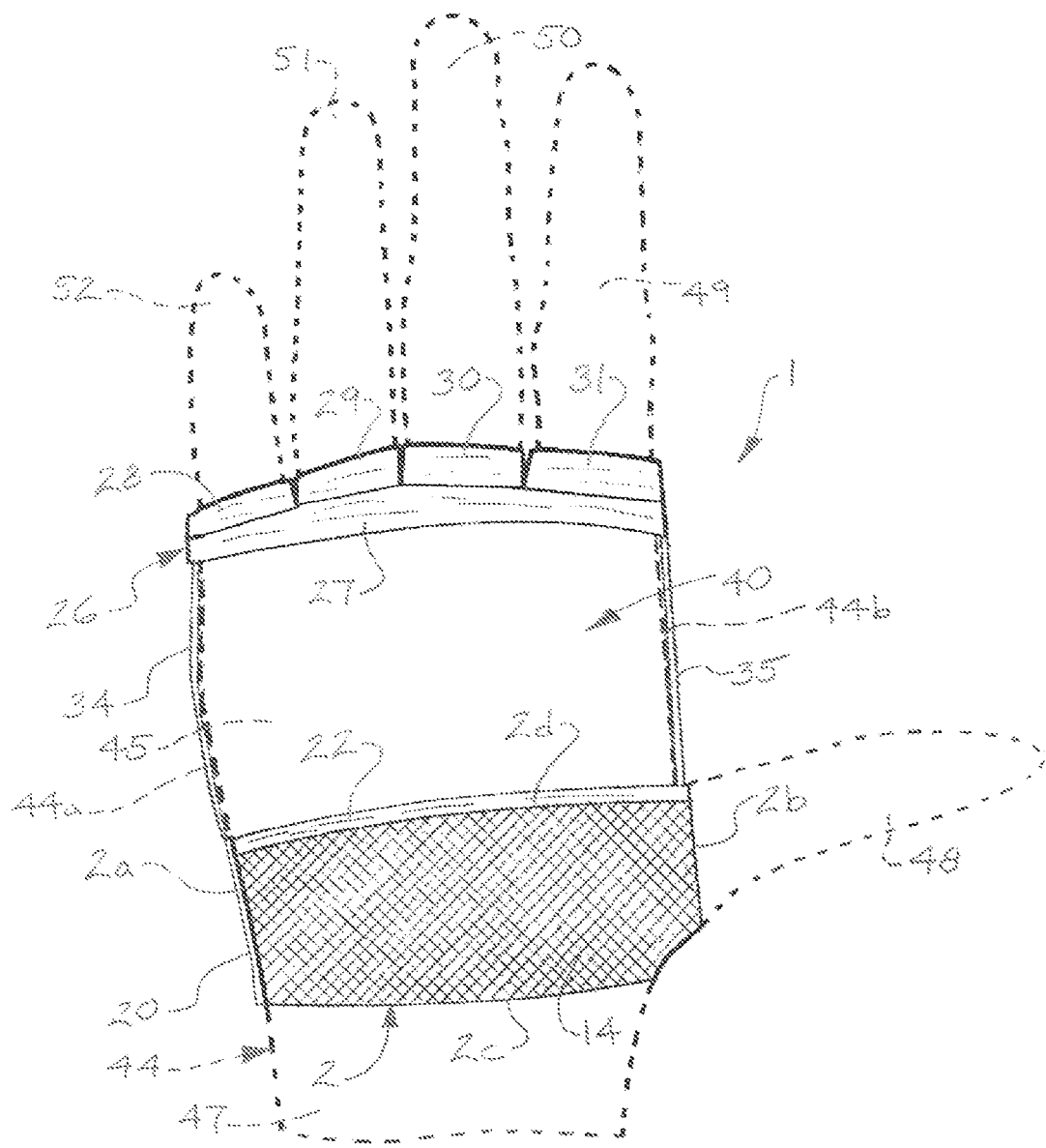
FIG. 6 is a palm side view of an illustrative cell phone glove, worn on the hand (illustrated in phantom) of a wearer.

Each connecting strap 34, 35, 36 may connect the finger portion 26 to the hand protrusion edge 2d of the wrist portion 2. In some embodiments, an inner connecting strap 34, an outer connecting strap 35 and a middle connecting strap 36 may connect the finger portion 26 to the hand protrusion edge 2d of the wrist portion 2. The inner connecting strap 34 and the outer connecting strap 35 may correspond in position to the inner wrist portion edge 2a and the outer wrist portion edge 2b, respectively, of the wrist portion 2. Accordingly, the inner connecting strap 34 and the outer connecting strap 35 may extend along the medial edge 44a and the lateral edge 44b, respectively, of the user's hand 44 as the cell phone glove 1 is donned on the hand 44, as illustrated in FIGS. 5 and 6. The middle connecting strap 36 is disposed between the inner connecting strap 34 and the outer connecting strap 35. The middle connecting strap 36 may be attached to the backhand panel 3 at the hand protrusion edge 2d. In some embodiments, a protrusion edge strap 22 may extend along the edges of the backhand panel 3 and the palm and 8 and/or the pocket panel 14 at the hand protrusion edge 2d. The inner connecting strap 34, the outer connecting strap 35 and the middle connecting strap 36 may be attached to the protrusion edge strap 22 is sewing and/or other suitable attachment technique. Each of the inner connecting strap 34, the outer connecting strap 35 and the middle connecting strap 36 may be fabricated of the same material as that of the wrist portion 2.

The finger portion 26 of the cell phone glove 1 may include a finger portion strap 27. When the cell phone glove 1 is donned on the user's hand 44, the finger portion strap 27 engages the palm side 45, the backhand side 46, the medial edge 44a and the lateral edge 44b at the upper portion of the user's hand 44. An index finger ring 28, a middle finger ring 29, a ring finger ring 30 and a little finger ring 31 may be provided on the finger portion strap 27 in adjacent relationship to each other. The index finger ring 28, middle finger ring 29, ring finger ring 30 and little finger ring 31 accommodate the index finger 49, the middle finger 50, the ring finger 51 and the little finger 52, respectively, of the user's hand 44. The index finger ring 28, the middle finger ring 29, the ring finger ring 30 and the little finger ring 31 may be attached to the finger portion 26 via sewing and/or other suitable attachment technique. Each of the index finger ring 28, the middle finger ring 29, the ring finger ring 30 and the little finger ring 31 may be fabricated of the same material as that of the wrist portion 2. A hand space 40 is formed by and between the hand protrusion edge 2d of the wrist portion 2, the finger portion strip 27 of the finger portion 26 and the inner connecting strap 34, the outer connecting strap 35 and the middle connecting strap 36. The hand space 40 accommodates the user's hand 44 when the cell phone glove 1 is donned.

Referring again to FIGS. 5-8 of the drawings, in exemplary application, the cell phone glove 1 is donned on the hand 44 of the user as illustrated and as was heretofore described. The inner connecting strap 34 and the outer connecting strap 35 extend along the medial edge 44a and the lateral edge 44b, respectively, whereas the middle connecting strap 36 extends along the backhand side 46 of the hand 44. Accordingly, the hand space 40 accommodates the hand 44, as illustrated in FIG. 6.

As illustrated in FIG. 7, a cell phone 60 is secured in the cell phone glove 1 by inserting a lower edge 61 of the cell phone 60 in the cell phone pocket 18 (FIG. 2). The backside of the cell phone 60 rests against the finger portion 26 such that the display 63 of the cell phone 60 faces outwardly from the palm side 45 of the hand 44. The upper edge 62 of the cell phone 60 is positioned at the palm surface of the index finger 49, middle finger 50, ring finger 51 and little finger 52. Therefore, the display 63 of the cell phone 60 is oriented such that it can be easily viewed, accessed and manipulated by the user of the cell phone glove 1 as the user walks, jogs or engages in some other exercise.

As illustrated in FIG. 8, it will be appreciated by those skilled in the art that the cell phone glove 1 securely retains the cell phone 60 in the user's hand 44 as the hand 44 is in a lowered position. The lower edge 61 of the cell phone 60 is secured in the cell phone pocket 18 (FIG. 2), whereas the upper edge 62 of the cell phone 60 engages and rests on the palm surface of the index finger 49, middle finger 50, ring finger 51 and little finger 52. Therefore, the natural curvature of the index finger 49, middle finger 50, ring finger 51 and little finger 52 prevents the cell phone 60 from inadvertently slipping from the cell phone glove 1 as the wearer jogs or walks with his or her hands by his or her side. The cell phone glove 1 securely retains the cell phone 60 at all angles or orientations during the exercise.

While illustrative embodiments of the disclosure have been described above, it will be recognized and understood that various modifications can be made and the appended claims are intended to cover all such modifications which may fall within the spirit and scope of the disclosure.

What is claimed is:

1. A glove, comprising:
   a wrist portion including a backhand panel and a palm panel carried by the backhand panel;
   a wrist space formed by and between the backhand panel and the palm panel in the wrist portion;
   a pocket panel carried by the palm panel;
   a cell phone pocket formed by and between the palm panel and the pocket panel in the wrist portion adjacent to the wrist space;
   a finger portion disposed in spaced-apart relationship to the wrist portion;
   an inner connecting strap, an outer connecting strap and a middle connecting strap connecting the finger portion to the wrist portion; and
   a hand space formed by and between the wrist portion and the finger portion and the inner connecting strap, the outer connecting strap and the middle connecting strap.

2. The glove of claim 1 wherein the wrist portion comprises an inner wrist portion edge, an outer wrist portion edge and a hand insertion edge and a hand protrusion edge extending between the inner wrist portion edge and the outer wrist portion edge.

3. The glove of claim 2 further comprising a thumb opening in the outer wrist portion edge.

4. The glove of claim 2 further comprising an inner wrist portion strap extending along the inner wrist portion edge.

5. The glove of claim 2 further comprising a protrusion edge strap extending along the hand protrusion edge of the wrist portion, and wherein the at least one connecting strap extends from the protrusion edge strap.

6. The glove of claim 1 wherein the finger portion comprises a plurality of finger rings carried by the inner connecting strap, the outer connecting strap and the middle connecting strap.

7. A glove, comprising:
a wrist portion including an inner wrist portion edge, an outer wrist portion edge and a hand insertion edge and a hand protrusion edge extending between the inner wrist portion edge and the outer wrist portion edge;
a wrist space in the wrist portion;
a cell phone pocket in the wrist portion adjacent to the wrist space;
a finger portion disposed in spaced-apart relationship to the wrist portion;
an inner connecting strap, an outer connecting strap and a middle connecting strap connecting the finger portion to the wrist portion;
a protrusion edge strap extending along the hand protrusion edge of the wrist portion, and wherein the inner connecting strap, the outer connecting strap and the middle connecting strap extend from the protrusion edge strap; and
a hand space formed by and between the wrist portion and the finger portion and the inner connecting strap, the outer connecting strap and the middle connecting strap.

8. The glove of claim 7 further comprising a thumb opening in the outer wrist portion edge.

9. The glove of claim 7 further comprising an inner wrist portion strap extending along the inner wrist portion edge.

10. The glove of claim 7 wherein the wrist portion comprises a backhand panel and a palm panel carried by the backhand panel, and the wrist space is formed by and between the backhand panel and the palm panel.

11. The glove of claim 10 further comprising a pocket panel carried by the palm panel, and wherein the cell phone pocket is formed by and between the palm panel and the pocket panel.

12. The glove of claim 7 wherein the finger portion comprises a plurality of finger rings carried by the inner connecting strap, the outer connecting strap and the middle connecting strap.

13. A glove, comprising:
a wrist portion including:
an inner wrist portion edge, an outer wrist portion edge and a hand insertion edge and a hand protrusion edge extending between the inner wrist portion edge and the outer wrist portion edge;
a thumb opening in the outer wrist portion edge;
an inner wrist portion strap extending along the inner wrist portion edge;
a protrusion edge strap extending along the hand protrusion edge;
a wrist space extending between the inner wrist portion edge, the outer wrist portion edge, the hand insertion edge and the hand protrusion edge; and
a cell phone pocket adjacent to the wrist space;
a finger portion disposed in spaced-apart relationship to the wrist portion;
an inner connecting strap, an outer connecting strap and a middle connecting strap connecting the finger portion to the protrusion edge strap of the wrist portion; and
a hand space formed by and between the wrist portion and the finger portion and the inner connecting strap, the outer connecting strap and the middle connecting strap.

14. The glove of claim 13 wherein the wrist portion comprises a backhand panel and a palm panel carried by the backhand panel, and the wrist space is formed by and between the backhand panel and the palm panel.

15. The glove of claim 14 further comprising a pocket panel carried by the palm panel, and wherein the cell phone pocket is formed by and between the palm panel and the pocket panel.

16. The glove of claim 13 wherein the finger portion comprises a finger portion strap carried by the inner connecting strap, the outer connecting strap and the middle connecting strap and a plurality of finger rings carried by the finger portion strap.

* * * * *